United States Patent [19]
Morris et al.

[11] Patent Number: 5,818,536
[45] Date of Patent: Oct. 6, 1998

[54] MOTION VECTOR SELECTION USING A COST FUNCTION RELATING ACCURACY TO BIT RATE

[75] Inventors: Octavius J. Morris, Redhill, England; Gerrit J. Keesman, Eindhoven, Netherlands

[73] Assignee: U.S. Philips Corporation, New York, N.Y.

[21] Appl. No.: 721,915

[22] Filed: Sep. 27, 1996

[30] Foreign Application Priority Data

Sep. 29, 1995 [GB] United Kingdom ............... 9519923

[51] Int. Cl.⁶ ............................................. H04N 7/32
[52] U.S. Cl. .................................... 348/416; 348/699
[58] Field of Search .................... 348/416, 699, 348/402, 415, 409, 401, 400, 390, 384; H04N 7/133, 7/137

[56] References Cited

U.S. PATENT DOCUMENTS

| | | | |
|---|---|---|---|
| 5,138,446 | 8/1992 | Guichard et al. | 348/416 |
| 5,526,438 | 6/1996 | Barton | 382/237 |
| 5,654,759 | 8/1997 | Augenbraun et al. | 348/416 |

FOREIGN PATENT DOCUMENTS

| | | | |
|---|---|---|---|
| 0535746A2 | 4/1993 | European Pat. Off. | H04N 5/14 |
| 0540961 | 5/1993 | European Pat. Off. | H04N 7/13 |
| 0673171A2 | 9/1995 | European Pat. Off. | H04N 7/50 |
| 2712449A1 | 5/1995 | France | H04N 7/30 |

OTHER PUBLICATIONS

Bernd Girod, "Rate–constrained motion estimation", SPIE, vol. 2308, No. 2, 1994, pp. 1026–1034.
Combinatorial Optimization: Algorithms and Complexity, C. Papadimitriou et al, Prentice Hall 1982, pp. 448–451.

*Primary Examiner*—Bryan Tung
*Attorney, Agent, or Firm*—Laurie E. Gathman

[57] ABSTRACT

A method and apparatus for improved motion vector selection in the motion estimator stage of a video encoder such as an MPEG coder are provided. From a received (re-ordered) image frame sequence, a first stage (14) of the estimator generates a set of candidate motion vectors, suitably from a list of half-pixel candidates from about each of N candidate integer pixels. Those candidate vectors, together with an indication of their respective accuracies, are passed to a vector selection stage (16). A vector bit counter (18) determines the number of bits required per vector and the selection stage (16) then selects those of the candidate vectors for a macroblock line (or "slice") which minimise a cumulative cost function for the line and provide the best trade-off between motion vector accuracy and required bit rate for each block of the line. The derivation of the cumulative cost function and its application to coding mode selection is described.

10 Claims, 3 Drawing Sheets

| Full Search (QP = 10) | | | |
|---|---|---|---|
| SNR (dB) | Vector bits | Coeff bits | Total bits |
| 35.50 | 473777 | 1056747 | 1798043 |

FIG. 5A

| Rate constrained search (QP = 10) | | | |
|---|---|---|---|
| SNR (dB) | Vector bits | Coeff bits | Total bits |
| 35.459 | 235451 | 1127801 | 1619381 |

FIG. 5B

| Rate constrained search (QP = 8) | | | |
|---|---|---|---|
| SNR (dB) | Vector bits | Coeff bits | Total bits |
| 35.8528 | 246810 | 2221400 | 2763468 |

FIG. 5C

MOTION VECTOR SELECTION USING A COST FUNCTION RELATING ACCURACY TO BIT RATE

BACKGROUND OF THE INVENTION

The present invention relates to a method and apparatus for the encoding of pixel images and, in particular, to coding techniques using motion compensated prediction in accordance with standards such as MPEG and H.261.

Motion compensated prediction is an essential element of techniques such as MPEG video compression, where it is used to reduce the temporal redundancy in the signal. Since one picture in an image sequence is normally very similar to a displaced copy of its predecessors, transmitting motion vector data allows a good prediction of the current picture from previous pictures.

In MPEG video coding, a coded picture is transmitted by multiplexing into a single stream data representing different types of information. It is a layered coding syntax, with the higher layers transmitting information about the encoding parameters used, and the lower layers containing several classes of information that allow a decoder to reconstruct individual pixel values. The basic unit of coding is the 16×16 (256-pixel) macroblock. Each macroblock has an associated "macroblock type" that defines the coding mode in use in that block, other overhead information defining parameters of coding, suitably one or more motion vectors used for motion compensated prediction, and coded data representing discrete cosine transform (DCT) coefficients. The motion vectors are used to form an estimator (or prediction) of the pixel values of the current macroblock based on past and future "reference" pictures. The motion vector defines a displacement in the reference picture from the position of the current macroblock where a prediction of the current macroblock may be found.

Known MPEG-compatible encoders search for a set of motion vectors that give a good prediction of the current frame without regard to the bit-rate needed to represent the vectors. An example of such an encoder is described in European Patent Application EP-A-0,540,961 (Gonzales et al/IBM), which is concerned with allocating a budget of bits to the different pictures in a sequence and optimizing the visual quality of each picture given the number of allocated bits, by adaptive quantisation of the DCT coefficients in the picture.

An alternative technique which seeks to provide optimum bit allocation is described in "Rate-constrained motion estimation" by Bernd Girod, pp.1026–1033, SPIE Vol.2308, where the general principles of how bits should be allocated optimally to video data streams made up of individual data types and the basic idea of rate constrained motion estimation is developed. Problems with the principles developed by Girod include their pixel-to-pixel or area-to-area derivation over successive image frames: this conflicts with systems such as MPEG where successive macroblock motion vectors are coded in relation to the vectors of the previous block within that frame.

SUMMARY OF THE INVENTION

It is an object of the present invention to provide improved bit-allocation to different coding components in a coding scheme where difference coding is applied both within and between image frames of a sequence.

In accordance with the present invention there is provided a method for encoding an ordered sequence of pixel image frames in which each frame is divided into rows containing an integer number of pixel macroblocks, at least some of the macroblocks are coded with motion vectors specifying a displacement for macroblock data from a further image frame of the sequence, and the image data is then subject to transform compression to provide an encoded signal; characterised in that the motion vectors are selected from a set of candidate motion vectors on the basis of a cost function relating motion vector accuracy to vector data bit rate in the encoded signal.

By use of the cost function, the derivation of one form of which is described herein, the selected motion vectors are not necessarily optimum but the bit rate saving can then be applied to the coded transform coefficients such as to produce an overall improvement in the quality of the decoded image. The selection of the coding mode (macroblock type) may also be subject to the cost function such as to produce a further enhancement.

The cost function is preferably made cumulative over a macroblock row, with the motion vectors (and optionally coding mode) per macroblock of the row being chosen to minimise the accumulated row cost function. Dynamic programming may suitably be used to specify a recurrence relationship between the cost function for each macroblock of a row and that of the row as a whole.

The motion vector accuracy is suitably determined by the displaced frame difference for the macroblock (i.e. the difference between what is predicted by the vector and what is actually present) and the cost function may relate this displaced frame difference to an exponential function of the vector data bit rate.

The candidate motion vectors are preferably selected by a rate constrained search, in which a number of motion vectors to half pixel accuracy are derived for the N integer pixel placements having the lowest frame difference, where N is an integer. This technique is described in greater detail hereinafter. The image data is suitably subject to discrete cosine transform (DCT) compression such that the encoded signal may comply with MPEG standards.

Also in accordance with the present invention there is provided an image signal encoding apparatus for encoding an ordered sequence of pixel image frames, the apparatus comprising: an encoder arranged to receive the image frames, apply transform compression to the image data, and output an encoded image signal; and a motion estimator arranged to receive the image frames, to divide each into rows of pixel macroblocks and, for predetermined ones of the macroblocks, to generate motion vectors specifying a displacement for the macroblock data from a further image frame of the sequence, wherein the generated motion vector data is passed to the encoder and incorporated in the output encoded signal;

characterised in that the motion estimator comprises a vector generator arranged to generate a set of candidate motion vectors for each of the predetermined ones of the macroblocks in accordance with a predetermined criteria and with an indication of the accuracy for each, and a vector selection means operable to apply, to each candidate motion vector, a cost function relating the respective accuracy to the motion vector data bit rate in the encoded signal and to selectively pass to the encoder those motion vectors which minimise the cost function.

Suitably, the encoder may be operable to assign data bit rates in the encoded signal to motion vector data and to transform coefficient data in a ratio where the addition of one extra bit to either provides substantially the same reduction in image distortion for an encoded image when decoded, and the motion estimator is operable to modify the cost function in accordance with changes in the assigned motion vector data bit rate. Where the encoder is operable to apply a selected one from a number of coding modes (as described previously), the selection may suitably be made on the basis of the cost function from the vector selection means. Where, as above, the cost function is cumulative over a macroblock row, the vector selection means and encoder may suitably be respectively arranged to select the motion vectors and coding mode for each macroblock such as to minimise the accumulated row cost function.

BRIEF DESCRIPTION OF THE DRAWING

Preferred embodiments of the present invention will now be described in terms of the MPEG system by way of example only and with reference to the accompanying drawings in which:

FIGS. 5A to 5C contain experimental results for a conventional technique and techniques embodying the present invention.

DESCRIPTION OF THE PREFERRED EMBODIMENTS

In the following, the invention will be described principally in terms of MPEG-compatible coding schemes (as defined in ISO 11172 and ISO 13818), although it will be recognised that it is applicable to other coding schemes, particularly hybrid-DCT (discrete cosine transformation) based coding schemes, such as the H.261 standard for video-telephony. MPEG and H.261 are digital coding systems conventionally used for storing and compressing natural picture sequences, with the decoders being designed to interpret such encoded data and reproduce the same original sequence of images. Compressed MPEG streams consist of a number of different data-types in a layered structure. Some of the data is overhead that describes the coding parameters and options chosen and the motion vectors, and some is a direct representation of the DCT coefficient data.

Figure 1:
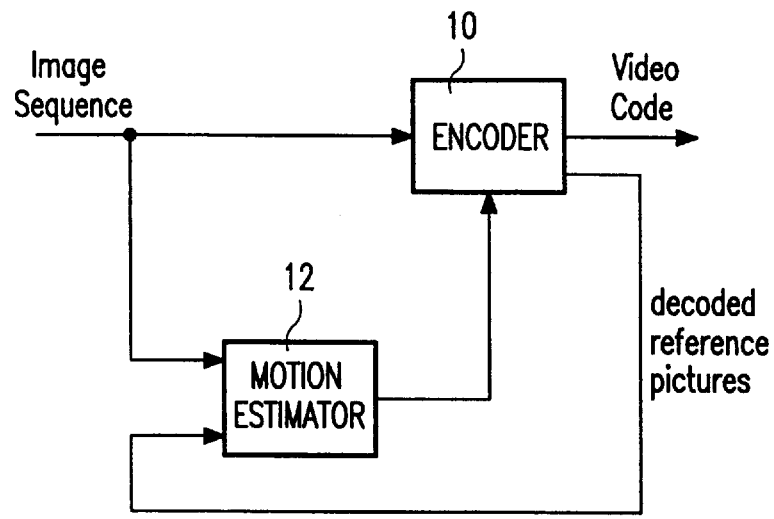
FIG. 1 is a block schematic diagram representing an MPEG encoder arrangement.

An MPEG encoding arrangement is shown in FIG. 1 where the reordered sequence of image frames is fed to an encoder stage 10 and also to a motion estimator stage 12. In the motion estimator 12, the motion vectors for each macroblock of an image are selected to define a displacement in the reference image frame for that block. These motion vectors are then passed to the encoder stage 10. Motion vectors based on recreated (i.e. decoded) pictures obtained from the encoder may also be generated.

In a conventional arrangement, the motion estimator selects which mode to use and searches for the motion vectors that give the best prediction, irrespective of the number of bits that must be used to transmit this data. The available bit-rate (from bandwidth considerations) that is left over after subtracting this overhead is used for the coefficient data. At lower bit rates (3 Mbit/sec for example) motion vector data forms up to about 25% of the data rate. In these circumstances, this bit allocation strategy will not generally give the best picture quality. As will be described however, improvements are proposed for the selection of both motion vectors and coding modes.

To enhance the image, the present invention provides the means for selecting a different choice on the basis of a cost function (to be described) where the choice consumes fewer bits for the motion vectors but provides nearly as good a prediction, thus providing a better use of the bit-rate as the bits that are saved can be used to provide more accurate representations of the DCT coefficients.

Figure 2:
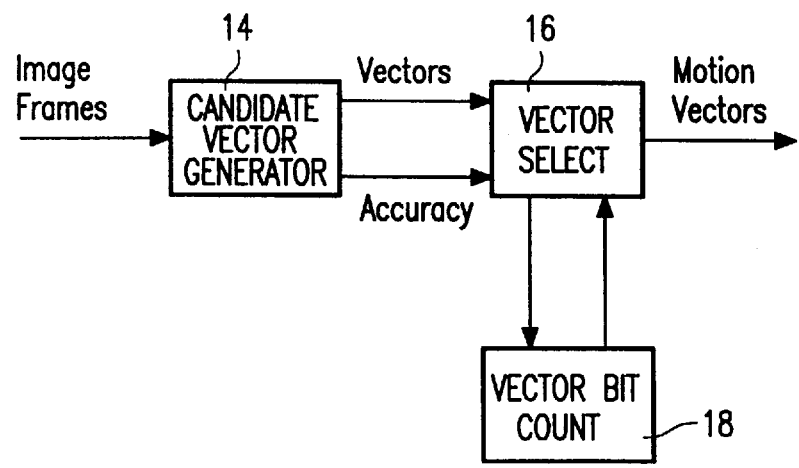
FIG. 2 shows an arrangement for the motion estimator stage of FIG. 1, embodying the present invention.

FIG. 2 shows an arrangement for the motion estimator stage of FIG. 1 embodying the present invention. The detailed operations performed by the respective stages will be described in detail hereinafter but, briefly, from the received (re-ordered) image frame sequence, a first stage 14 generates a set of candidate motion vectors, suitably from a list of half-pixel candidates from about each of N candidate integer pixels. Those candidate vectors, together with an indication of their respective accuracies, are passed to a vector selection stage 16. A vector bit counter 18 determines the number of bits required per vector and the selection stage 16 then selects those of the candidate vectors for a macroblock line (or "slice") which minimise a cumulative cost function for the line and provide the best trade-off between motion vector accuracy and required bit rate for each block of the line.

Figure 3:
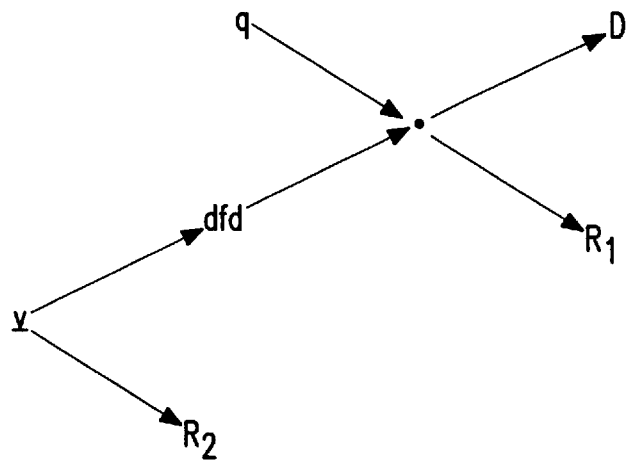
FIG. 3 schematically illustrates the relationship between different factors of an encoding optimisation of the invention.

Turning now to the derivation of a suitable cost function to provide the basis for the optimisation, this begins with choosing a motion vector v, having a bit-rate associated with transmitting that vector of $R_2$ and a displaced frame difference dfd. The relationship between the various choices that are made in the encoding optimisation is approximated in the "influence" diagram of FIG. 3, where v determines $R_2$ and dfd and q determine D and $R_1$; and where:

v is the choice of vector q is the choice of quantisation parameter dfd is the resulting displaced frame difference D is the resulting coding distortion $R_1$ is the bit-rate associated with coefficient data $R_2$ is the bit-rate associated with vector data The displaced frame difference dfd is given by:

$$dfd = \Sigma_{block}[I_1(x) - I_2(x+v)]^2$$

with $I_1$ being the current picture, $I_2$ being the reference picture used as the basis for the prediction, and x being the current position in the picture. This displaced frame difference may of course be generalised to include the case of interpolation prediction in MPEG B-pictures.

Assuming this model applies, a first (direct) approach to the problem is to minimise the total bit-rate ($R_1+R_2$) given a certain distortion D after decoding. This may be done by means of optimisation techniques using a Lagrangian multiplier approach, with the Lagrangian L taken as:

$$L = R_1 + R_2 + \lambda D \tag{1}$$

which we aim to minimise for some choice of the value $\lambda$.

Some further simplifications are applied to make this function computable, starting with the assumption that distortion D depends only on the setting of the quantisation parameter q and not on the displaced frame difference dfd. Experimental results confirm to a first order that, although this is an approximation, it is a reasonable assumption. Therefore the difference dfd determines the rate associated with coefficients $R_1$ but does not have direct impact on the distortion D. The severity of the error of this approximation is greatest with large values of $\lambda$ (at very low bit-rates).

In a further simplification, we assume that the coefficient rate $R_1$ is related to the dfd by the following function:

$$R_1 = c(q)\log\left[\frac{dfd}{q}\right] \quad (2)$$

where the function $c(q)$ is a constant for a given value of q. This equation corresponds to standard results in quantisation theory and can be approximately matched by experimental results.

Now the aim is to minimise the Lagrangian (equation 1) for a particular choice of vector. As minimising L is equivalent to minimising the exponential of $(L/c(q))$, since $c(q)$ is constant, we can obtain:

$$L = c(q)\log\left[\frac{dfd}{q}\right] + R_2 + \lambda d$$

$$\frac{L}{c(q)} = \log\left[\frac{dfd}{q}\right] + \frac{R_2}{c(q)} + \lambda\frac{D}{c(q)}$$

which gives:

$$\exp\left[\frac{L}{c(q)}\right] = \frac{dfd}{q}\exp\left[\frac{R_2}{c(q)}\right]\exp\left[\lambda\frac{D}{c(q)}\right] \quad (3)$$

It will be noted that the value of $\exp(\lambda D)$ is the same for any choice of vector, following from the assumption that D depends only on the quantisation parameter. It will also be noted that $c(q)$ does not depend on the vectors. Accordingly, it is sufficient to find a set of vectors that minimises:

$$C = dfd\exp\left[\frac{R_2}{c(q)}\right] \quad (4)$$

where C is the cost function.

Considering now the optimisation procedure, the bit-rate associated with a macroblock vector in MPEG is determined by the vector in the previous macroblock, because each motion vector is coded differentially with respect to the vector in the previous macroblock. This means that it is not possible to make optimal macroblock decisions in isolation from the neighbouring blocks (the bit-rate $R_2$ in equation 4 depends on the choice of vector in the previous macroblock), leading to the problem that the decisions have to made jointly over an entire MPEG "slice" (a line of macroblocks). We have recognised that dynamic programming techniques, as described for example in "Combinatorial Optimization: Algorithms and Complexity" by Papadimitriou and Steiglitz, published by Prentice-Hall 1982, ISBN 0-13-152462-3, pages 448–451, may be used to solve this problem, as will be described.

In an MPEG slice of macroblocks, each macroblock may have up to four vectors depending on its macroblock type. There may be 0, 1 or 2 frame based vectors or there may be 0, 1, 2, 3 or 4 field-based vectors, and vectors may reference a future field or frame or a past field or frame or a combination of past and future. During the following discussion of the optimisation we consider each type of motion vector separately although, in operation, the capability is preferably provided for handling different vector types synchronously. For example, we consider the frame-based forward vectors separately from the frame-based backwards vectors.

For each macroblock in the slice a set of candidate motion vectors is calculated to half pixel accuracy (as specified by MPEG) and a value of a prediction error function is found.

From the values found, a table is built up for each macroblock in the slice giving candidate vectors and their prediction error cost. When minimising equation 4, a prediction error function giving an absolute value of the difference dfd for that vector in that macroblock is used (dfd is the prediction error cost). For a different cost function C, a different prediction error function may be required, as will be understood.

Having built the table, a dynamic program is used to find the set of vectors, one per macroblock, that give the minimum value of the cost function C from equation 4 summed over all the macroblocks in the slice. We propose the use of dynamic programming as it is suited to decision making problems where each decision influences the others. A dynamic program starts from the final decision in the problem and works backwards to the earlier ones. It is based on the Principle of Optimality which states that: for a complete set of N decisions to be optimal, if the first (N−1) decisions are optimal then the Nth decision must also be optimal. We use this principle to break the optimisation problem down into a sequential set of decisions and to generate a recurrence relation that works backwards through the problem.

Figure 4:
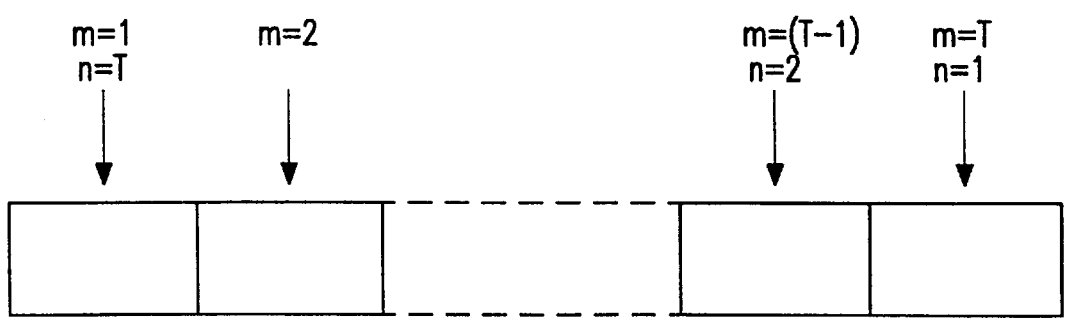
FIG. 4 represents a macroblock line consisting of T blocks across an image.

Considering equation 4 in generalised terms for a block slice as in FIG. 4, the cost of choosing a particular vector in a macroblock may be written as:

$$C_m(v_m(i), v_{m-1}(j)) = dfd_m(v_m(i))\exp\left[\frac{R(v_m(i), v_{m-1}(j))}{c(q)}\right] \quad (5)$$

where:

$C_m(v_m(i),v_{m-1}(j))$: is the cost of choosing vector $v_m(i)$ for the mth macroblock given the vector $v_{m-1}(j)$ was chosen in the (m−1)th macroblock.

$dfd_m(v_m(i))$: is the difference dfd with vector $V_m(i)$ in the mth macroblock.

$R(v_m(i),v_{m-1}(j))$: is the bit-rate with vector $v_m(i)$ in the mth macroblock given the choice of vector $v_{m-1}(j)$ in the (m−1)th macroblock.

$c(q)$: $c(q)$ is a constant.

Extending this over the slice, J(n) is the summed cost of continuing the optimal set of decisions at a point n macroblocks from the end of the slice, where J(1) is the cost of the optimal decision for the last macroblock in the slice given optimal decisions up to that point, J(2) is the cost of the optimal decision in the last two macroblocks of the slice and so on. Using the principle of optimality, a table of the optimal cost of each stage given the choice of vector in the previous macroblock is built up according to:

$$J(n+1,v_{m-1}(j))=\min_i[J(n,v_m(I))+C_m(v_m(I),v_{m-1}(J))] \quad (6)$$

where:

m is the number of the macroblock;

n is the distance from the end of the slice; and m=(number of macroblocks in slice+1−n)

as shown in FIG. 4.

From this table, starting from the beginning of the slice where the initial vector is zero, the best choice of vector may be determined at each stage. This set of vectors gives the lowest cost for the slice J(T) and so gives the best rate/distortion trade-off between accuracy and bit-rate needed for coding (given the assumptions made in the derivation of equation 4).

The number of candidate vectors considered for each macroblock is restricted since, if all possible vectors were considered in the dynamic program, the computational effort required would be enormous and the size of the table, J( ..., ... ), would be excessive. MPEG defines that vectors giving accuracy of prediction to within half a pixel may be used. In many implementations the vector search is done in two phases. First, the best matching integer vector is found by making comparisons between the current source picture and the reference picture (either the original uncoded picture or the decoded version). The second stage is to examine the eight neighbouring half-pixel vector locations around the integer pixel match to find the best half-pixel accurate vector.

In a rate constrained search, the first phase finds a set of N candidate integer pixels with the lowest displaced frame (field) difference. Secondly a list of half-pixel candidates is drawn up based on the eight neighbours of each integer pixel candidate. Duplicate half-pixel vectors are eliminated from this list (duplicates can arise where neighbouring integer pixels both define the same half-pixel vector). The displaced frame difference dfd for each half-pixel vector in the candidate list is calculated using the current source frame and the decoded and reconstructed reference frames. Finally the dynamic program is run to find the best set of macroblock vectors for each slice. This procedure is run independently of each set of the vectors (that is the forwards frame-based vectors, forwards field-based vectors, backwards frame-based vectors and backwards field-based vectors) although, as mentioned above, independent runs may occur synchronously.

To find the truly optimal set of vectors, it will be recognised that the bit-rate for coding the vectors should also take into account the macroblock type (coding mode) decision although the improvements in image quality will generally be at the expense of system complexity. In many encoders, vector information will be needed before the macroblock type decision is made. In order to avoid a causality problem, a two-pass procedure may be used with the first pass finding provisional vectors and making macroblock type decisions, and the second pass using the macroblock type decisions find the optimal set of vectors and, optionally, refining the macroblock type decisions.

A preferred option is to make the macroblock type decisions jointly with the vector decisions in a larger decision making process (i.e applying cost function optimisation to each), although this may have penalties in terms of complexity. The optimisation of macroblock type/coding mode works in the manner previously described for the motion vector search procedure. The cost function in the form of dfd.exp (rate/constant) is calculated for each vector and each mode and proceeds as described above to optimise both (or the net result thereof over the slice.

FIGS. 5A–C present experimental results in which the algorithm of equation 6 was implemented in an MPEG-2 software encoder. On the material processed, a saving of about 40–50% of the bit-rate normally allocated to vectors was found. This comes at the cost of reducing the effectiveness of the prediction by a small amount and increasing the number of bits allocated to the coefficients. Holding to the assumptions used in the derivation of the cost function, there will be a net reduction in bit rate for the same picture quality (same signal to noise ratio SNR).

In the tests, one second of a video image sequence was coded with a fixed quantisation step size (QP) using both a conventional search (FIG. 5A) and with the rate constrained full-search (FIG. 5B).

To find the net saving, the extra bits that would have to be allocated to the coefficient data to recover the loss in SNR was estimated. This was done by measuring the local gradient of the rate-distortion curve around the operating point by re-running the sequence with the rate constrained motion search with a QP=8 (FIG. 5C). From these tables, the coefficient bits that are needed to compensate for the loss in picture quality may be extrapolated as follows:

$$\Delta \text{coeffbits} = (35.50 - 35.459) \times \frac{(2221400 - 1127081)}{35.8528 - 35.459)} = 113933$$

Therefore:
Gross saving in bits           = 178662 bits
Compensating coefficient bits  = −113933 bits
Net saving in bits per second  = 64729 bits (4% of bit-rate)

Therefore:
   Gross saving in bits=178662 bits
   Compensating coefficient bits=−113933 bits
   Net saving in bits per second=64729 bits (4% of bit-rate)

In the foregoing, we have described a technique for motion vector searching that optimises a rate-distortion criterion to find the best suited motion vectors. In basic terms, the technique requires that the number of bits jointly allocated to motion vectors and to coefficient data is adjusted so that the marginal improvement in picture quality is equal when an extra bit is allocated to either motion vector data or coefficient data.

From reading the present disclosure, other modifications will be apparent to persons skilled in the art. Such modifications may involve other features which are already known in the design, manufacture and use of interactive image coding equipment and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

We claim:

1. A method of encoding image frame data for an ordered sequence of pixel image frames in which each of said frames is divided into rows containing an integer number of pixel macro blocks, at least some of said macro blocks are coded with motion vectors specifying a displacement for macro block data from a further image frame of said sequence, and said image frame data is then subject to transform compression to provide an encoded signal; wherein said motion vectors are selected from a set of candidate motion vectors on the basis of a cost function relating motion vector accuracy to an exponential function of vector data bit rate in said encoded signal, and wherein accuracy of said motion vectors is determined by a displaced frame difference for said macro block.

2. A method as claimed in claim 1, wherein said encoding comprises the additional step of selecting one from a plurality of possible coding modes per macroblock, the selection being made on the basis of said cost function.

3. A method as claimed in claim 2, wherein said cost function is cumulative over a row of said macroblocks, and those of said motion vectors per macroblock of said row are chosen to minimise said cost function accumulated over said row, and dynamic programming techniques are used to specify a recurrence relationship between said cost functions for each said macroblock of a row and that of said macroblock row as a whole.

4. A method as claimed in claim 1, wherein said cost function is cumulative over a row of said macroblocks, and those of said motion vectors per macroblock of said row are chosen to minimise said cost function accumulated over said row.

5. A method as claimed in claim 4, wherein dynamic programming techniques are used to specify a recurrence relationship between said cost functions for each said macroblock of a row and that of said macroblock row as a whole.

6. A method as claimed in claim 1, wherein said candidate motion vectors are selected by a rate constrained search, in which a number of motion vectors to half pixel accuracy are derived for the N integer pixel placements having the lowest frame difference, where N is an integer.

7. A method as claimed in claim 1, wherein said image data is subject to discrete cosine transform compression.

8. Image signal encoding apparatus operable to encode image frame data for an ordered sequence of pixel image frames, said apparatus comprising:

an encoder arranged to receive said image frames, apply transform compression to said image frame data, and output an encoded image signal;

a motion estimator arranged to receive said image frames, to divide each into rows of pixel macro blocks and, for predetermined ones of said macro blocks, to generate motion vectors specifying a displacement for macro block data from a further image frame of said sequence, wherein said generated motion vector data is passed to said encoder and incorporated in the output encoded signal; and wherein said motion estimator comprises a vector generator arranged to generate a set of candidate motion vectors for each of said predetermined ones of said macro blocks in accordance with a predetermined criteria and with an indication of accuracy for each, and a vector selection means operable to apply, to each candidate motion vector, a cost function relating the respective accuracy to an exponential of said motion vector bit rate in said encoded signal and to selectively pass to said encoder those motion vectors which minimize said cost function, and wherein accuracy of said motion vectors is determined by a displaced frame difference for said macro block.

9. Apparatus as claimed in claim 8, wherein said encoder is operable to assign data bit rates in said encoded signal to motion vector data and to transform coefficient data in a ratio where addition of one extra bit to either provides substantially the same reduction in image distortion for an encoded image when decoded, and said motion estimator is operable to modify said cost function in accordance with changes in the assigned motion vector data bit rate.

10. Apparatus as claimed in claim 8, wherein said encoder is operable to apply a selected one of a plurality of coding modes to a macroblock, selection being controlled by said cost function as applied from said vector selection means; wherein said cost function is cumulative over a macroblock row and said vector selection means and said encoder are respectively arranged to select said motion vectors and said coding mode per macroblock to minimise said cost function accumulated over said row.

* * * * *